R. G. WOODHAM.
SHOE CORSET.
APPLICATION FILED MAY 31, 1919.
1,358,488.
Patented Nov. 9, 1920.
2 SHEETS—SHEET 1.
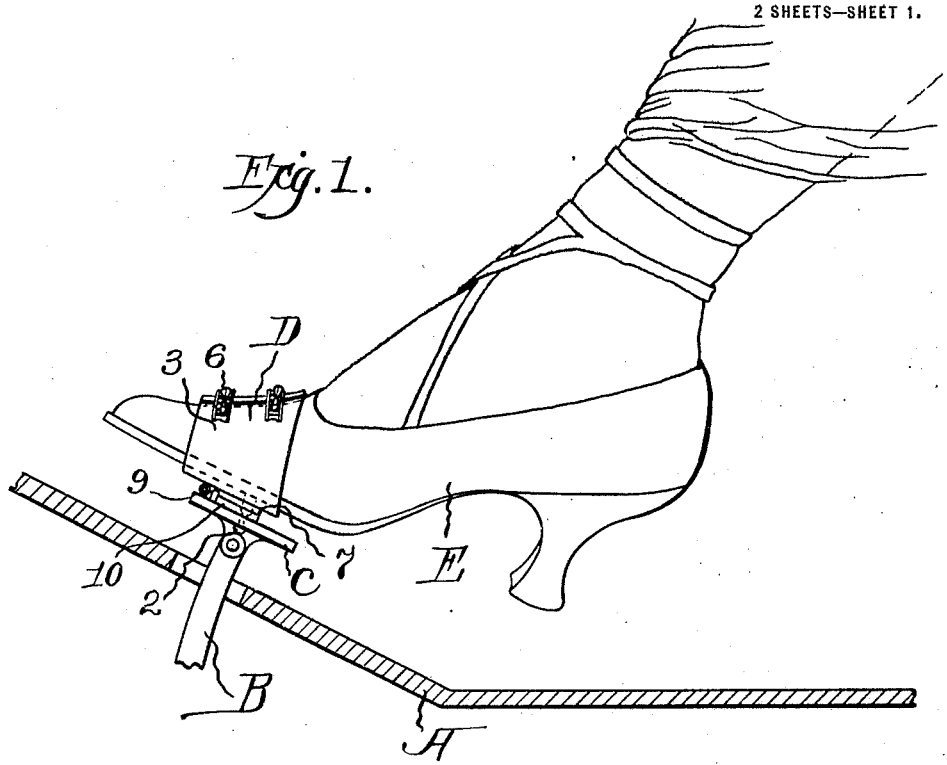
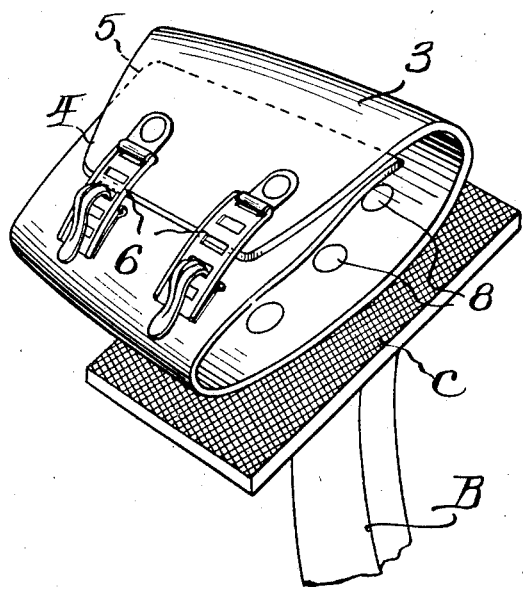
Inventor:
Reuben G. Woodham,
by: Howard Fischel,
Attorney.

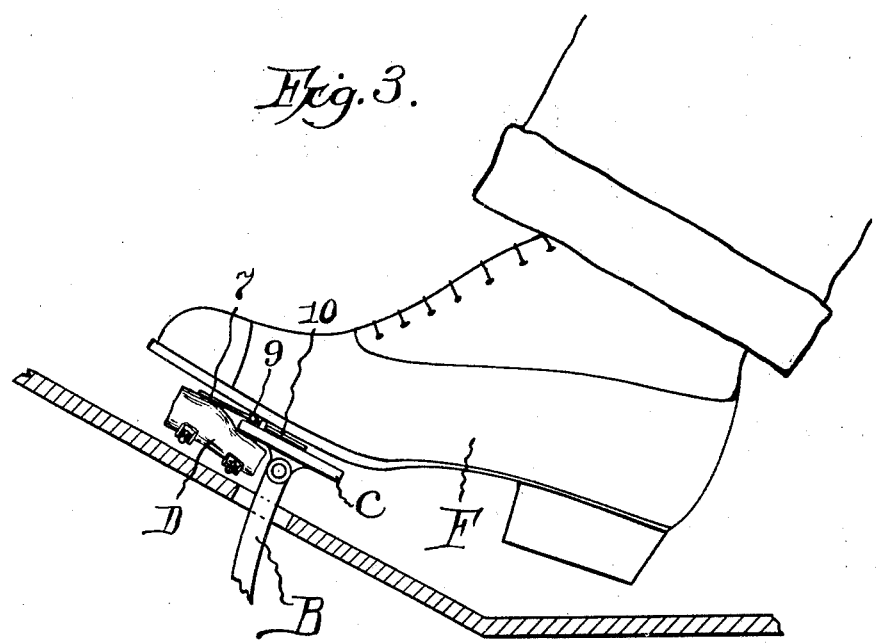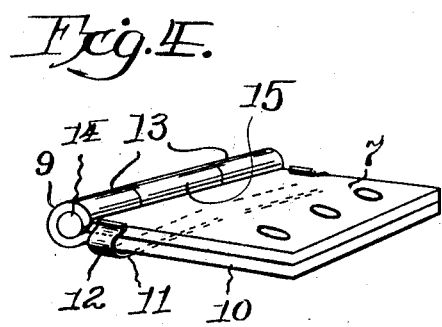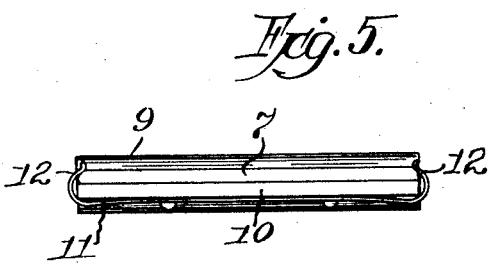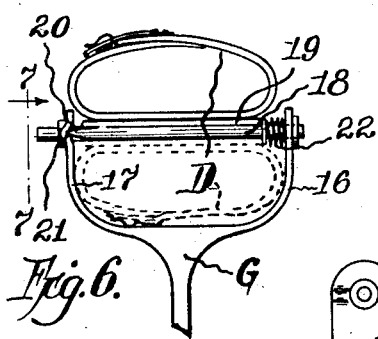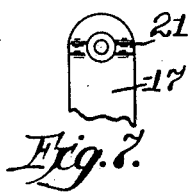

UNITED STATES PATENT OFFICE.

REUBEN G. WOODHAM, OF ST. PAUL, MINNESOTA.

SHOE-CORSET.

1,358,488.     Specification of Letters Patent.     Patented Nov. 9, 1920.

Application filed May 31, 1919. Serial No. 300,984.

*To all whom it may concern:*

Be it known that I, REUBEN G. WOODHAM, a citizen of the United States, residing at St. Paul, in the county of Ramsey and State of Minnesota, have invented a new and useful Improvement in Shoe-Corsets, of which the following is a specification.

In the operation of motor vehicles, it is necessary that the foot pedals be operated more or less often and in operating these pedals it is necessary to apply pressure to the same with the foot. Some motor vehicles have foot pedals which require more pressure than others but even those which require the least amount of pressure have a tendency to stretch the shoe of the operator, especially if the operator's shoe is of a fine and delicate nature, such as a lady's shoe, and this invention is designed to overcome this difficulty.

It is also an essential feature of this invention to provide a corset for the ball of the shoe that is held in position to easily receive the ball and toe of the shoe or to be turned into an inoperative position so that the foot pedal of a motor vehicle having this shoe corset attached thereto can be operated without using the same and without the same causing any inconvenience to the operator. In fact, when the shoe corset is turned into inoperative position, the pedal is as free and easy to operate as if the same were not attached thereto.

Further, this invention provides a shoe corset which is quickly adjustable to different sizes and shapes of shoes and is designed to protect the most delicate foot piece, to prevent the same from spreading under the pressure of the foot against a motor vehicle pedal which this device is attached to.

The drawings illustrate the shoe corset attached to a foot pedal of a motor vehicle, only a portion of the same being illustrated.

Figure 1 shows the corset attached to a pedal and illustrating the position of the same when in use.

Fig. 2 is a perspective view of the corset attached to a pedal, only a portion of the pedal being illustrated.

Fig. 3 illustrates the foot pedal as it would appear in use when the shoe corset is turned out of operating position.

Fig. 4 is a perspective view of a portion of the device.

Fig. 5 is a front view of the portion illustrated in Fig. 4.

Fig. 6 is a front view of an alternative construction of foot pedal having the shoe corset attached thereto.

Fig. 7 is a view of a detail of one of the arms of the pedal illustrated in Fig. 6 at the position of line 7—7.

The drawing illustrates a floor board A of a motor vehicle and a foot pedal B, the operating arm of which projects through the floor board A and which supports the face or pedal engaging plate C, to which the shoe corset D is attached by means of suitable rivets 2.

The body portion 3 of the shoe corset is formed of leather, or other suitable, flexible material, and is provided with overlapping ends 4 and 5, which are secured together by suitable, adjustable buckles or snaps 6, so that the ends 4 and 5 can be drawn closer together or adjusted so as to increase the size of the shoe engaging band of the corset D. By means of the overlapping ends of the buckles 6, the engaging band can be adjusted to any suitable size or shape, within a reasonable limit, for different shoes very quickly and easily, still holding the body portion or band of the corset firmly in position so as to engage the ball of the shoe of the operator to prevent the same from stretching out of shape when pressure is applied to the pedal B.

Fig. 1 illustrates a lady's shoe and foot as it would appear operating the pedal B. The lady's shoe or pump E is illustrated in this view in operating position in the corset D, which firmly engages the ball of the same so as to receive the pressure in the band or body portion 3 of the corset and to relieve the side walls of the shoe from carrying the strain of the pressure of the foot in operating the pedal B. In use the corset D has been found to be of material benefit to the shoe, prolonging the life of the same and preventing any distortion in the shape from operating the pedal. It is obvious that this device is more adaptable to ladies' shoes, as they are usually of a more delicate nature than men's shoes, but if it is desired, the corset is equally adaptable for men's shoes and will protect them in the same manner.

While the corset D is primarily for the purpose of protecting the shoe E, it also assists a lady in operating the pedals B to keep her foot or feet in position on the pedal, ready for operation, not necessarily with pressure on the pedal, but in a resting position so that she can operate the pedal quickly when necessary and in a position to apply a considerable force to the pedal, without danger of injuring her shoe or having her foot slip off from the pedal. This is an essential feature, due to the fact that ladies' shoes are of a different shape than men's, being more apt to slip off of the pedal, and the corset band 3, which is made of any suitable material that is soft and not apt to injure the leather of the shoe, holds her foot centrally to the pedal plate. The corset band or body 3 should not be of any material which is easily stretched, but on the other hand should be of such material as to prevent stretching to hold the shoe in shape, this being its essential and primary object.

The body or band 3 of the corset D is held rigidly by the rivets 8 to the plate 7 of the hinge 9, while the other plate 10 of the hinge is rigidly secured to the face plate C of the pedal B by suitable rivets 2, so as to hingedly hold the shoe corset D to the face plate C of the pedal B. The hinging of the corset D to the foot pedal allows the same to be turned into the position illustrated in Fig. 3, with the shoe corset D engaging against the lower surface of the forward portion of the face plate C, to hold the same under the plate 7 and below the plate C of the pedal so that a shoe F, such as a man's shoe, can engage the pedal freely without interfering with the corset D and without the corset causing any inconvenience in the easy operation of the pedal B. Thus when the shoe corset is not desired for use in connection with the pedal B, it is merely turned on its hinge connection into the position illustrated in Fig. 3.

A suitable spring 11 is secured in any manner to the plate 10 of the hinge 9 and is formed with spring engaging ends 12. The spring 11 is so positioned to the plate 10 that the spring engaging ends 12 are closely positioned to the hinge point of the plates 7 and 10 so as to protect the upwardly extending engaging ends of the spring catches 12 from engagement with the foot or shoe F when the shoe corset is in the position illustrated in Fig. 3. The spring catches 12 engage the plate 7 to hold the shoe corset D in position for use and prevent it from being easily turned out of engaging position, thus allowing the toe of the shoe to be freely inserted in the band or body 3.

Figs. 4 and 5 illustrate the hinge 9 with the shoe corset band 3 removed therefrom to illustrate the spring holding means 12, which hold the shoe corset in operative position.

The hinge 9 can be constructed so that the ears 13 of the plate 10 would be rigidly secured to the pintle 14 and the ears 15 of the plate 7 frictionally engage the pintle 14 to hold the plates 7 and 10 of the same against free movement and thus hold the shoe corset D in operating position without the use of the spring catches 12, but it is essential that the shoe corset D should be held in position when it is desired for use so that the toe of the shoe can be easily and quickly inserted in the band 3 of the same so as to operate the pedal B and thus not making it necessary for the operator to keep his foot continually in the shoe corset D when the shoe corset D is turned out of operating position on its hinge 9. It is essential that the band 3 of the corset engage the pedal plate C to frictionally hold the corset against free movement when the pedal is operated and to prevent the same from flopping around when it is not in use.

The foot pedal G illustrated in Fig. 6 is formed with a bifurcated end so as to provide arms 16 and 17 which pivotally hold the shaft 18, and a foot pedal plate 19 is rigidly held to one side of the shaft 18. In this construction the shoe corset D is secured to the plate 19 in any suitable manner so as to be rigidly attached thereto and the shaft 18 is held against free turning in the arms 16 and 17 by the sharp ends 20, which are held into engagement in the groove 21 by the coil spring 22 at the opposite end of the shaft 18, the spring 22 being strong enough to hold the sharp ends 20 engaging in the groove 21 under ordinary circumstances so as to hold the shoe corset D on top of the shaft 18 in position to be engaged by the shoe of the operator or to allow the same to be turned into the position illustrated in dotted outline in Fig. 6 between the bifurcated ends of the pedal G. The shoe corset D is turned into the lower position when it is not desired for use, thereby giving a pedal of ordinary construction and operation without having the shoe corset interfere and holding the same neatly between the arms 16 and 17, comparatively invisible. The sharp ends 20, together with the coil spring 22, firmly hold the pedal plate and other connecting parts of the same in either position, but allowing the shaft 18 to pivot in the arms 16 and 17 when the pedal is operated, thus giving a sufficiently flexible construction for practical operation.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. A shoe corset for engaging the portion of a shoe which is adapted to operate a motor vehicle pedal, an adjustable shoe engaging band, means for hingedly holding said band to the face plate of a pedal so that said band can be turned into inoperative position with said band engaging the lower surface of said pedal plate to hold said shoe corset in inoperative position to allow said pedal plate to be engaged without interfering with said corset.

2. A shoe corset in combination with a motor vehicle pedal, including a pedal plate, a shoe engaging band for engaging and binding the pedal engaging portion of a shoe to confine and prevent stretching of said shoe, means for hingedly holding said band to said plate in operative, or in inoperative positions and a spring catch for locking said band in operative position to hold the same against free movement while the toe of a shoe is being inserted in said band.

3. In a device of the class described in combination with a foot pedal, a non-stretching, flexible shoe engaging band, means for adjusting the size of said band, means for holding said band on the upper surface of said foot pedal in position to receive the toe of a shoe to hold the same against stretching when pressure is applied to said pedal with the shoe in said band, means for holding said band in position so that the shoe can be inserted or withdrawn freely therefrom, said band holding means allowing said band to be turned into position below said pedal out of operating position so that said pedal can be operated independent of said band.

REUBEN G. WOODHAM.